(12) United States Patent
Bak et al.

(10) Patent No.: US 7,266,831 B2
(45) Date of Patent: Sep. 4, 2007

(54) INSERTION TYPE COMPACT DISC CASE

(75) Inventors: Byeong-Seon Bak, 1-160 Seongnam-2-Dong, Dong-Gu, Daejeon (KR); Jae-Sun Jeon, Daejeon (KR)

(73) Assignee: Byeong-Seon Bak (KR)

( * ) Notice: Subject to any disclaimer, the term of this patent is extended or adjusted under 35 U.S.C. 154(b) by 440 days.

(21) Appl. No.: 10/883,306

(22) Filed: Jul. 1, 2004

(65) Prior Publication Data

US 2005/0081232 A1   Apr. 14, 2005

(30) Foreign Application Priority Data

Oct. 14, 2003  (KR) ...................... 20-2003-0032215
Mar. 22, 2004  (KR) ...................... 10-2004-0019482

(51) Int. Cl.
G11B 23/03 (2006.01)
B65D 85/57 (2006.01)
A47B 81/06 (2006.01)

(52) U.S. Cl. .................. 720/728; 312/9.19; 206/308.1

(58) Field of Classification Search ................ 720/733, 720/728; 312/9.11–9.28; 206/308.1
See application file for complete search history.

(56) References Cited

U.S. PATENT DOCUMENTS

| | | | |
|---|---|---|---|
| 3,730,602 A * | 5/1973 | Campbell et al. .......... 312/9.27 |
| 4,705,166 A * | 11/1987 | Ackeret .................... 206/308.1 |
| 4,728,157 A * | 3/1988 | David, Jr. .................. 312/9.16 |
| 4,875,578 A * | 10/1989 | Nehl ........................ 206/308.1 |
| 4,964,510 A * | 10/1990 | Loyd .......................... 206/306 |
| 5,000,316 A * | 3/1991 | Lerner ..................... 206/308.1 |
| 5,011,010 A * | 4/1991 | Francis et al. ............. 206/307 |
| 5,450,953 A * | 9/1995 | Reisman .................... 206/310 |
| 5,495,939 A * | 3/1996 | Castritis .................... 206/307 |
| 5,505,299 A * | 4/1996 | Ditzig et al. ............. 206/308.1 |
| 5,590,768 A * | 1/1997 | Hilton et al. ............ 206/308.1 |

(Continued)

FOREIGN PATENT DOCUMENTS

KR   20-2001-0011670   4/2001

Primary Examiner—Brian E. Miller
(74) Attorney, Agent, or Firm—Cantor Colburn LLP

(57) ABSTRACT

Disclosed herein is an insertion type compact disc case which is designed to simultaneously push forward opposite sides of a rear periphery of a disc, received in a case body, thereby securing safe and accurate discharge of the disc. The disc case comprises a case body internally defining a square receiving space, into and from which a circular compact disc is inserted and discharged through an opening formed at a front surface thereof, a pair of elongated slits laterally formed at a rear surface of the case body, and a pair of discharge operating cam plates symmetrically arranged at both lateral positions in a rear region of the receiving space in correspondence to both the elongated slits so that they are laterally movable along guide units. Rear portions of the discharge operating cam plates protrude outward beyond the elongated slits so as to be exposed to the outside, respectively. When the discharge operating cam plates are laterally moved so as to approach each other according to manual operation of the outwardly protruding rear portions thereof, inner peripheral surfaces of the discharge operating cam plates push opposite sides of a rear periphery of the disc forward, thereby discharging the disc to the outside. The disc case further comprises a pair of locking units symmetrically arranged at both sides of the receiving space for holding both sides of the received disc.

22 Claims, 11 Drawing Sheets

U.S. PATENT DOCUMENTS 5,676,246 A * 10/1997 Gloger .................... 206/308.1
5,706,943 A *  1/1998 Yu ........................ 206/387.12
5,944,180 A *  8/1999 Koh et al. ............... 206/308.1
6,086,170 A *  7/2000 Chen ........................ 312/9.11
6,578,935 B1 *  6/2003 Garretson et al. ......... 312/9.16

* cited by examiner

INSERTION TYPE COMPACT DISC CASE

BACKGROUND OF THE INVENTION

1. Field of the Invention

The present invention relates to a case for use in the storage of a circular compact disc (CD), and more particularly to an insertion type compact disc case designed to insert and discharge a circular compact disc through its front side.

2. Description of the Related Art

In general, compact disc cases are used to safely store an information recorded compact disc, (hereinafter, simply referred to as a disc), thereby preventing damage to information on the disc due to external factors.

The compact disc cases are basically classified into cover open type disc cases designed to receive a disc through their top side, and insertion type disc cases designed to insert and discharge a disc in a lateral direction.

The cover open type disc cases, although they are advantageous in view of easy insertion and discharge of a disc in an open state of a cover thereof, due to a structural vulnerability in a connecting portion between the cover and a disc receiving body, have a problem in that they may be easily broken at the connecting portion if external shock is applied thereto.

In case of the insertion type disc cases, they can secure not only easy insertion of a disc but also high resistance to damage due to external shock, but they are problematic in relation to discharge of a disc received therein.

In order to solve such a problem of the insertion type disc cases, Utility Model Registration, filed in the Korean Intellectual Property Office as Serial No. 2001-11670, discloses a compact disc storage device (hereinafter, referred to as a prior storage device), and features thereof will be described as follows.

In the disclosed prior art, a case of the storage device has an inner disc receiving space, into and from which a disc is inserted and discharged through a front opening, and inside the disc receiving space is provided an operating unit, which is adapted to move forward for the discharge of the disc, received in the receiving space, as it is manually operated at the outside of the case.

The operating unit comprises: a moving bar which is laterally mounted in the disc receiving space so as to move forward or rearward, and a mover protruding upward from one side of the moving bar for enabling manual operation of the moving bar at the outside of the case.

With such a configuration, as the moving bar is moved forward according to manual operation, the disc, received in the disc receiving space of the case, can be discharged to the outside.

During such a forward movement of the moving bar, however, a propulsive force is applied to only one side of the moving bar, thereby causing the other side of the moving bar to move in a rearwardly tilted state.

As a result, in the discharge course of the disc received in the disc receiving space, it is inevitably skewed to one side when it is moved forward. This may obstruct easy discharge of the disc, or may cause damage to the disc due to collision between a periphery of the disc and an inner wall surface of the case.

Furthermore, if the front opening of the disc case faces downward when the case is carried, the disc received in the receiving space is inadvertently discharged from the case, resulting in damage thereto.

SUMMARY OF THE INVENTION

Therefore, the present invention has been made in view of the above problems, and it is an object of the present invention to provide an insertion type disc case which is designed to simultaneously push forward opposite sides of a rear periphery of a disc received in a case body thereof, thereby securing safe and accurate discharge of the disc.

It is another object of the present invention to provide an insertion type disc case which can secure easy insertion of a guide sheet, namely, inner sheet, printed with a description of the received disc and the lyrics of the respective songs recorded on the disc.

It is a further object of the present invention to provide an insertion type disc case which is designed to firmly hold both sides of a disc received in its inner receiving space, thereby being capable of preventing inadvertent discharge of the disc during carrying of the case.

It is a further object of the present invention to provide an insertion type disc case which is designed to position a disc at a middle height of a disc receiving space thereof while being equally spaced apart from inner top and bottom surfaces of a case body, thereby being capable of safely protecting the disc from any damage due to external shock.

It is yet another object of the present invention to provide an insertion type disc case which can enable the removal of impurities on a surface of a disc when the disc is inserted into or discharged from an inner disc receiving space.

In accordance with the present invention, the above and other objects can be accomplished by the provision of an insertion type compact disc case comprising: a case body internally defining a square receiving space, into and from which a circular compact disc is inserted and discharged through an opening formed at a front surface thereof; a pair of elongated slits laterally formed at a rear surface of the case body; and a pair of discharge operating cam plates symmetrically arranged at both lateral positions in a rear region of the receiving space in correspondence to both the elongated slits so that they are laterally movable along guide units, rear portions of the discharge operating cam plates protruding outward beyond the elongated slits so as to be exposed to the outside, respectively, as the discharge operating cam plates being laterally moved so as to approach each other according to manual operation of the outwardly protruding rear portions thereof, inner peripheral surfaces of both the discharge operating cam plates pushing opposite sides of a rear periphery of the disc forward, thereby discharging the disc to the outside.

Preferably, the insertion type compact disc case may further comprise a pair of locking units symmetrically arranged at both sides of the receiving space for holding both sides of the disc received in the receiving space.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Reference will now be made in greater detail to a preferred embodiment of the invention, an example of which is illustrated in the accompanying drawings.

Figure 1:
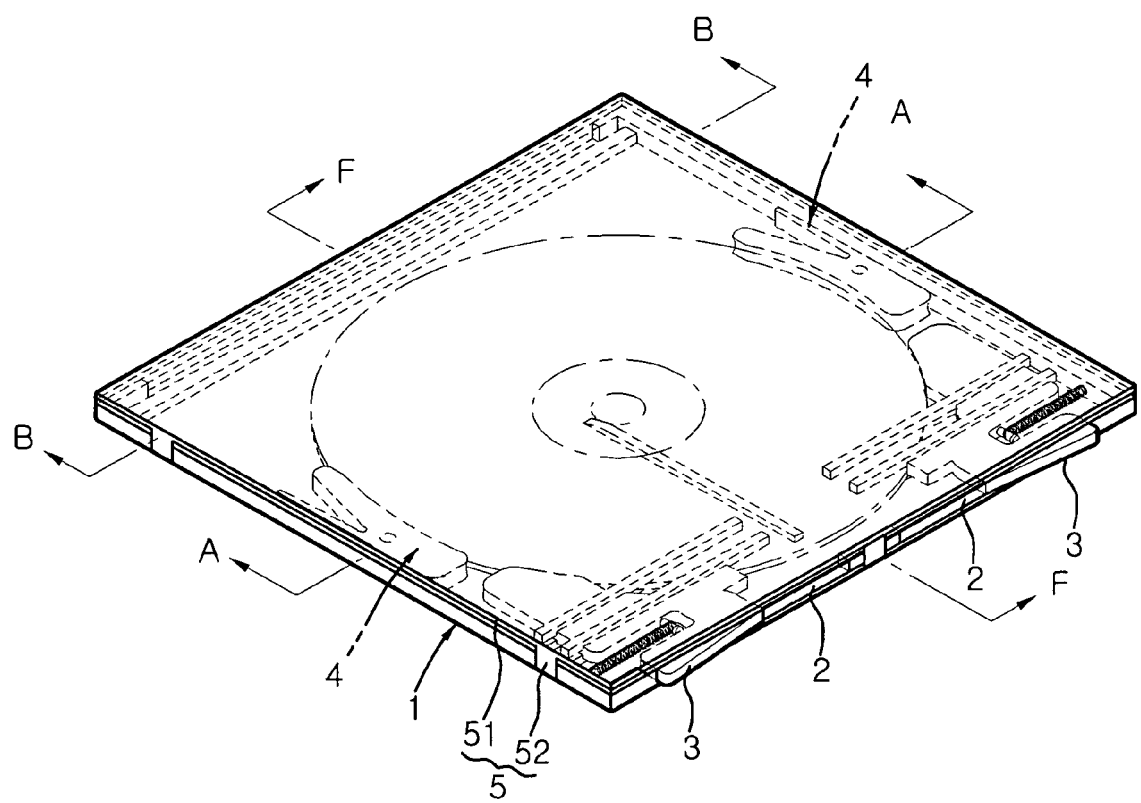
FIG. 1 is a rear perspective view illustrating an insertion type compact disc case in accordance with an embodiment of the present invention.
Figure 2:
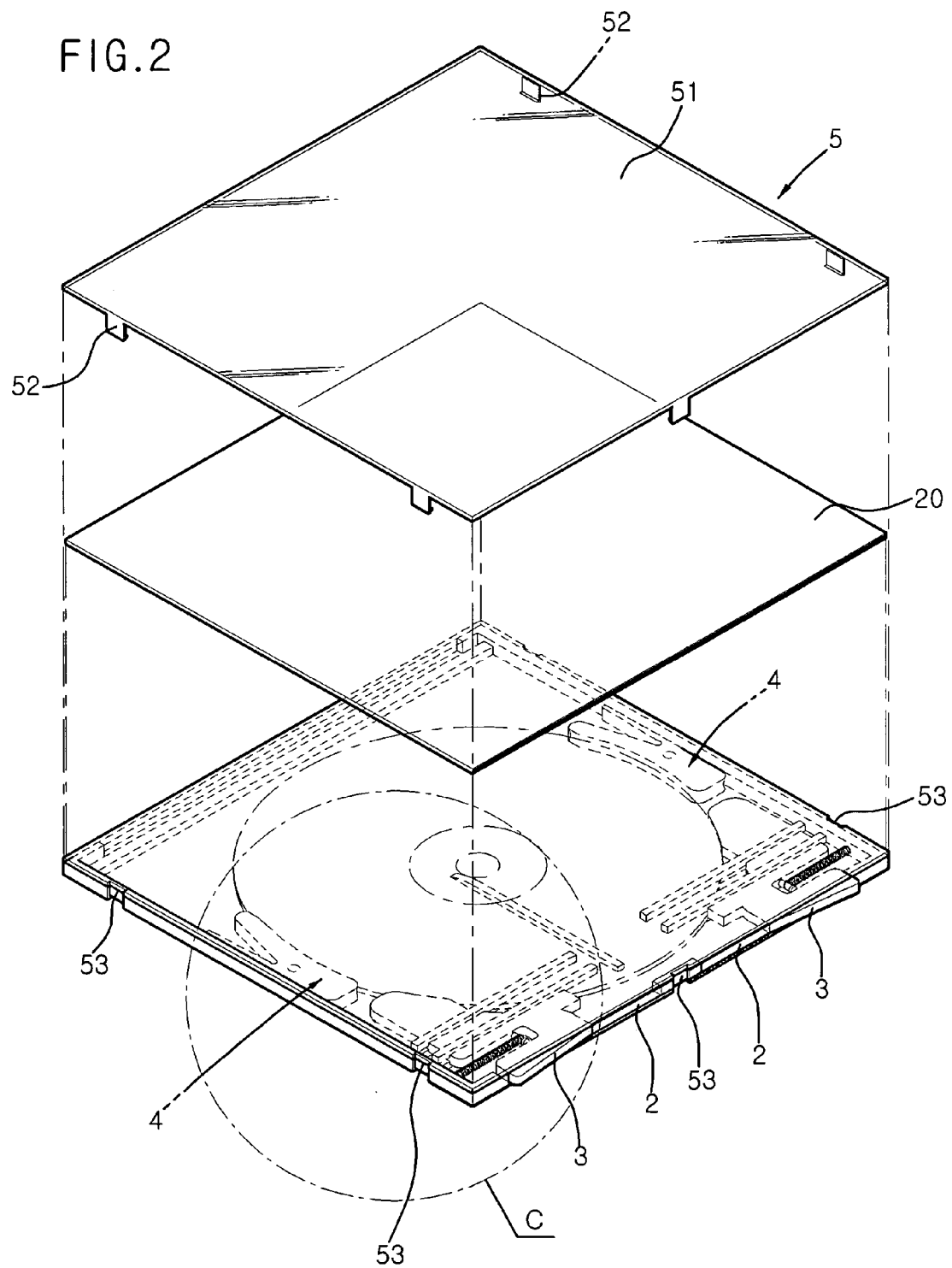
FIG. 2 is a rear exploded perspective view illustrating the disc case in accordance with the present invention.
Figure 3:
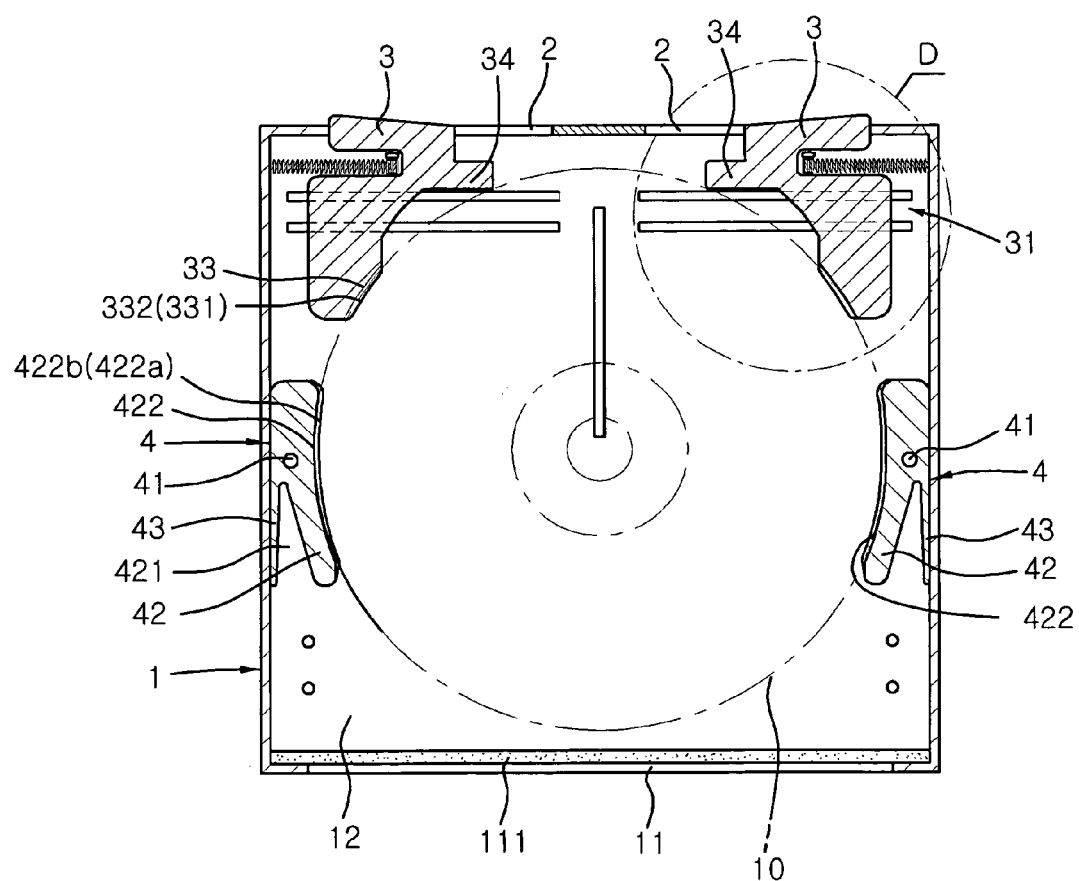
FIG. 3 is a plan sectional view illustrating the interior structure of the disc case in accordance with the present invention.
Figure 4:
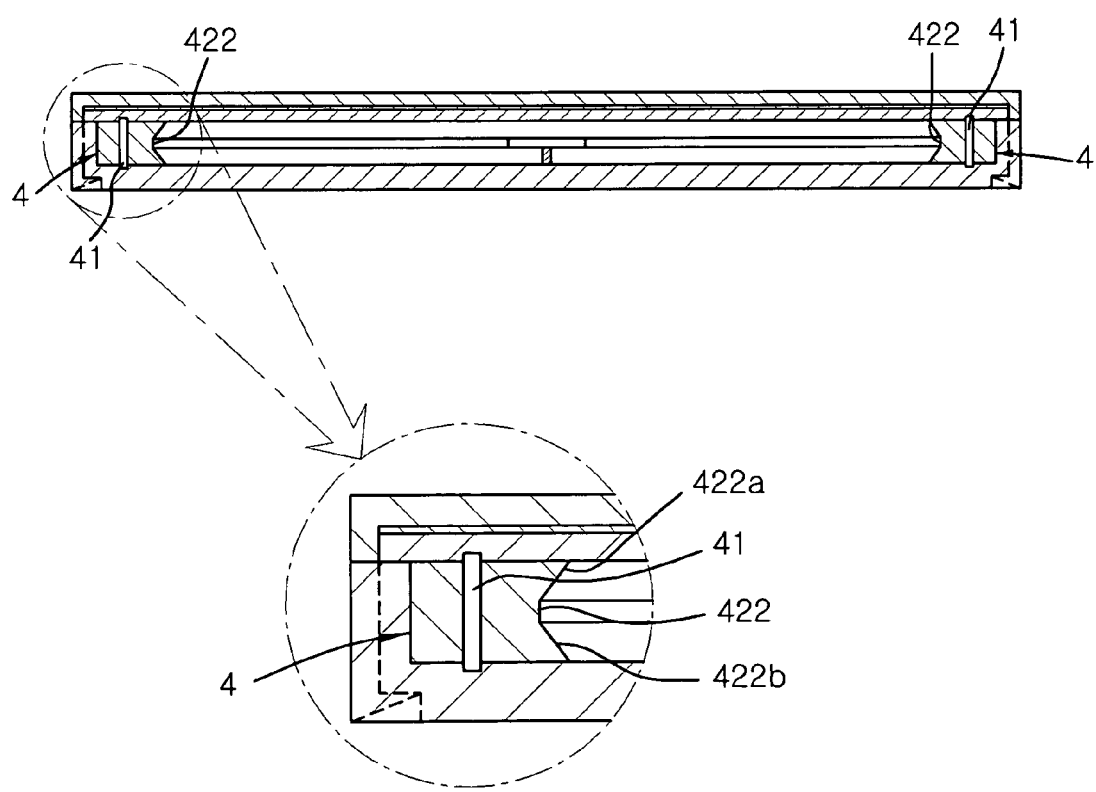
FIG. 4 is a sectional view taken along the line A—A shown in FIG. 1.

FIG. 1 is a rear perspective view illustrating an insertion type compact disc case in accordance with an embodiment of the present invention. FIG. 2 is a rear exploded perspective view illustrating the disc case in accordance with the present invention. FIG. 3 is a plan sectional view illustrating the interior structure of the disc case in accordance with the present invention. FIG. 4 is a sectional view taken along the line A—A shown in FIG. 1.

The compact disc case of the present invention comprises: a case body 1 which internally defines a square receiving space 12, into and from which a circular compact disc 10 is inserted and discharged through an opening 11 formed at a front surface of the case body 1; a pair of elongated slits 2 laterally formed at a rear surface of the case body 1; and a pair of discharge operating cam plates 3 which are symmetrically arranged at both lateral positions in a rear region of the receiving space 12 in correspondence to both the elongated slits 2, and are adapted to push forward the disc 10 received in the receiving space 12 for discharging it to the outside through the front opening 11.

The discharge operating cam plates 3, symmetrically arranged at both lateral positions, are laterally movable along guide units 31, which are correspondingly provided at both lateral positions of the rear region of the receiving space 12. In order to enable manual operation by a user from the outside, rear portions of the discharge operating cam plates 3 protrude outward beyond the elongated slits 2 so as to be exposed to the outside. When the discharge operating cam plates 3 are laterally moved so as to approach each other as the user operates the outwardly protruding rear portions of both the discharge operating cam plates 3, inner peripheral surfaces of both the discharge operating cam plates 3 act to push opposite sides of a rear periphery of the disc 10 forward, thereby causing the disc 10 to be discharged to the outside through the front opening 11.

The compact disc case of the present invention further comprises a pair of locking units 4, which are located at both sides of the receiving space 12, and are adapted to firmly hold both sides of the received disc 10 in order to prevent inadvertent discharge of the disc 10 from the receiving space 12 when the disc case is carried.

Each of the locking units 4 comprises: a fixing pole 41 located at a middle of either side edge of the receiving space 12; and a locking bar 42 longitudinally fitted at a center thereof to the fixing pole 41 in a rotatable manner. A front portion of the locking bar 42 defines a rotation space 421 together with an adjacent inner side wall surface of the case body 1, and an inner peripheral surface of the locking bar 42 takes the form of a circular arched surface 422 suitable for tightly holding either side of the disc 10 received in the receiving space 12. The locking unit 4 further comprises a plate spring 43 extending forward from an outer edge of the locking bar 42 so that it is positioned in the rotation space 421 while coming into contact with the inner side wall surface of the case body 1. The plate spring 43 serves to constantly push the front portion of the locking bar 42 inward. In addition, the circular arched surface 422 of the locking bar 42 has symmetrical upper and lower inclined surface portions 422a and 422b, which define a groove having a deepest depth at a portion corresponding to a middle height of the receiving space 12 in order to allow the disc 10 to be positioned at the middle height of the receiving space 12.

Now, referring to FIG. 2, the case body 1 comprises: a lower body section internally defining the receiving space 12, in which the discharge operating cam plates 3 and the locking units 4 are provided; and an upper cover integrally formed with the lower body section for covering a top side of the receiving space 12. At an inner bottom surface of the case body 1 is attached a sponge strip 111 immediately inside the front opening 11. The sponge strip 111 is used to remove impurities on a recorded surface of the disc 10 when the disc 10 is inserted into or discharged from the receiving space 12.

Figure 5:
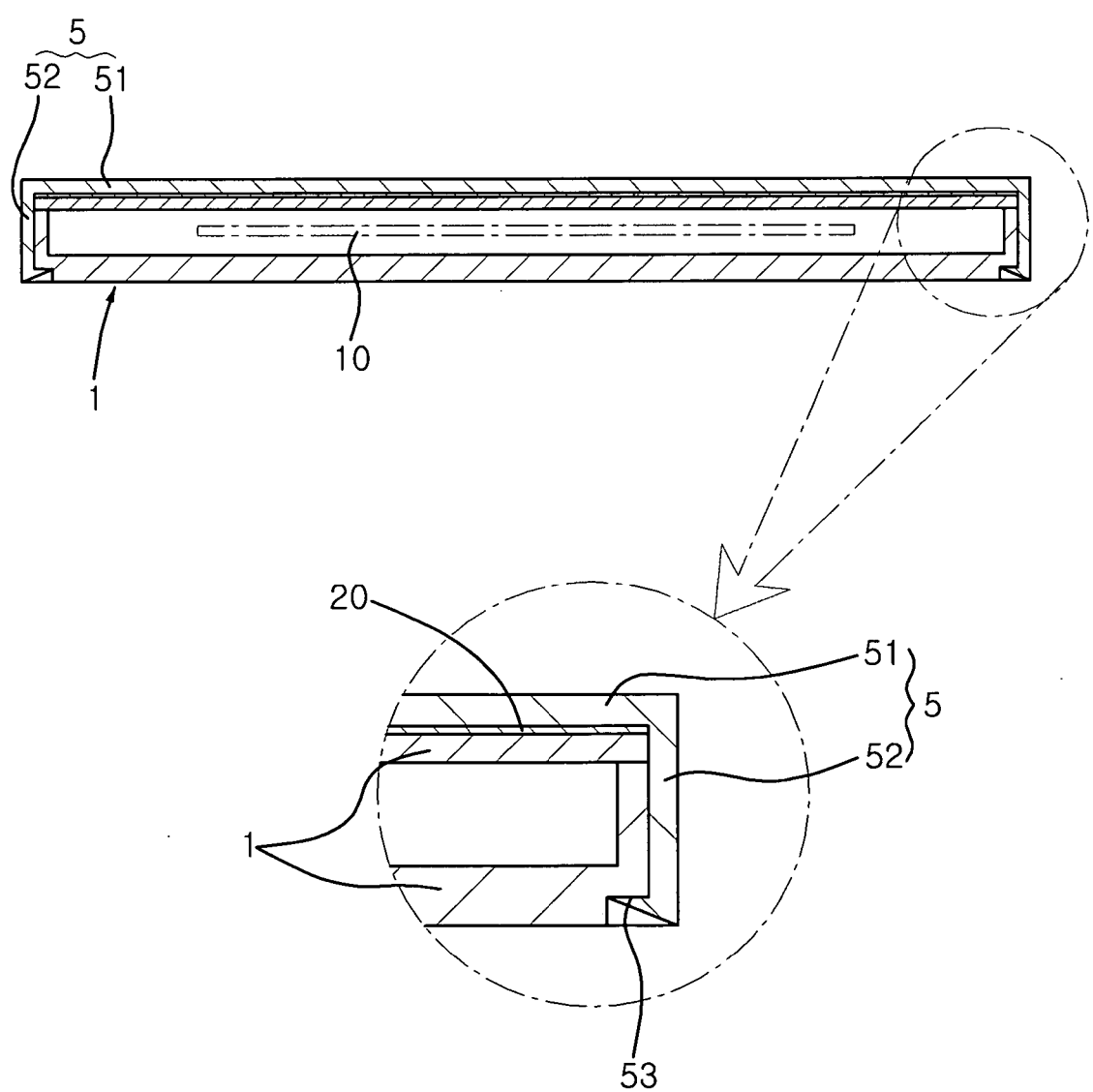
FIG. 5 is a sectional view taken along the line B—B shown in FIG. 1.

Reference is now made to FIG. 5, which is a sectional view taken along the line B—B shown in FIG. 1. As shown in FIGS. 2 and 5, the insertion type compact disc case of the present invention further comprises an inner sheet insertion unit 5 installed at an upper surface of the case body 1 for the insertion of an inner sheet 20.

The inner sheet insertion unit 5 comprises: a transparent cover plate 51 for covering the inner sheet 20 disposed on the upper surface of the case body 1; and a plurality of downwardly protruding hook pieces 52 formed at predetermined positions of a periphery of the transparent cover plate 51 so as to be caught by a lower edge of the case body 1 for fixing the transparent cover plate 51 relative to the upper surface of the case body 1.

In correspondence to the downwardly protruding hook pieces 52, a plurality of fitting grooves 53 are formed along an outer wall surface and the lower edge of the case body 1 so that the downwardly protruding hook pieces 52 are tightly fitted therein so as not to protrude out of the case body 1.

With such a configuration, after the inner sheet 20 is disposed on the upper surface of the case body 1, the transparent cover plate 51 is put on the case body 1 to cover the inner sheet 20, and the downwardly protruding hook pieces 52 arranged at the periphery of the cover plate 51 are caught by the lower edge of the case body 1. Thereby, the inner sheet 20 is inserted in the compact disc case of the present invention.

Now, the above described configuration of the disc case will be explained in detail.

Figure 6:
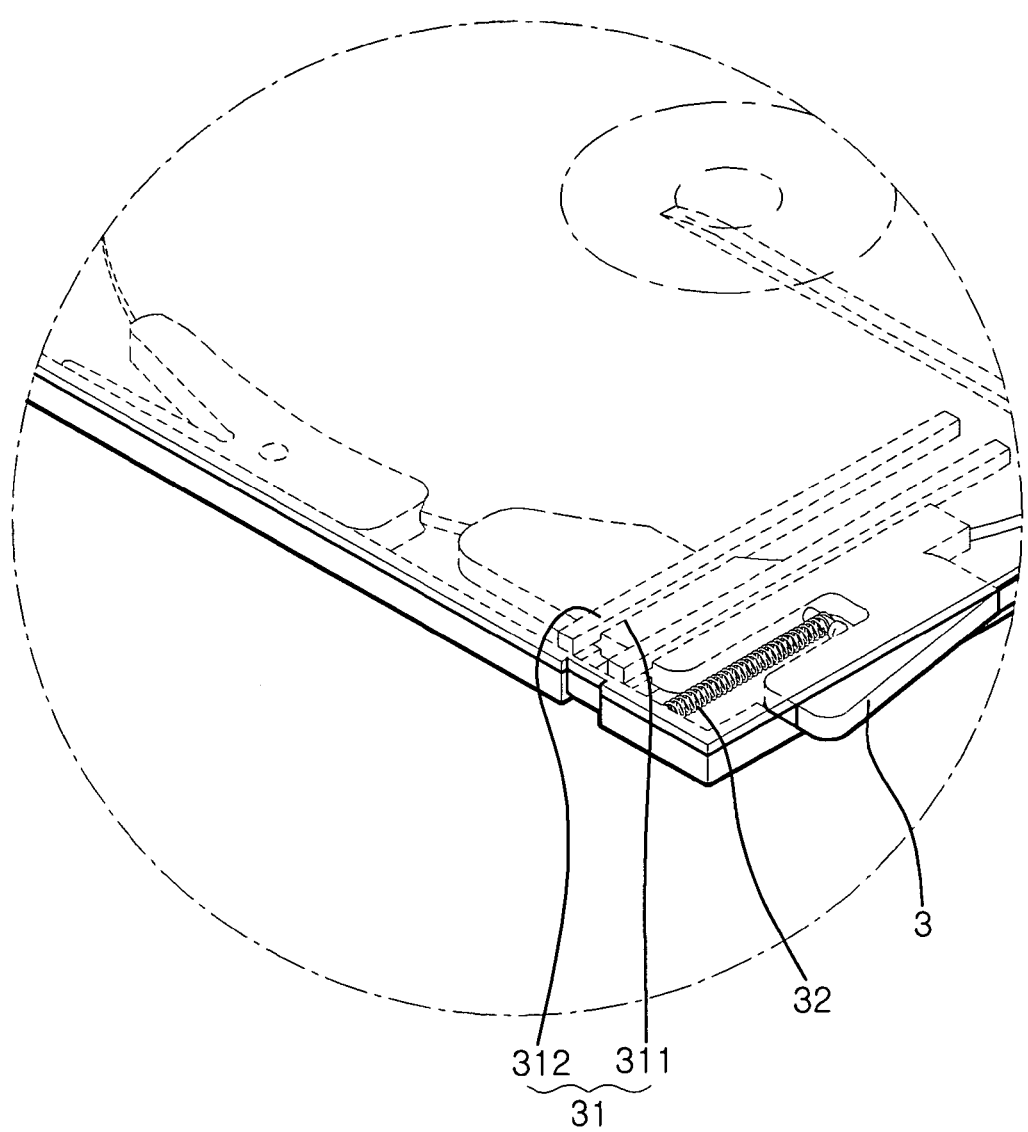
FIG. 6 is an enlarged view of the circle portion C shown in FIG. 2.
Figure 7:
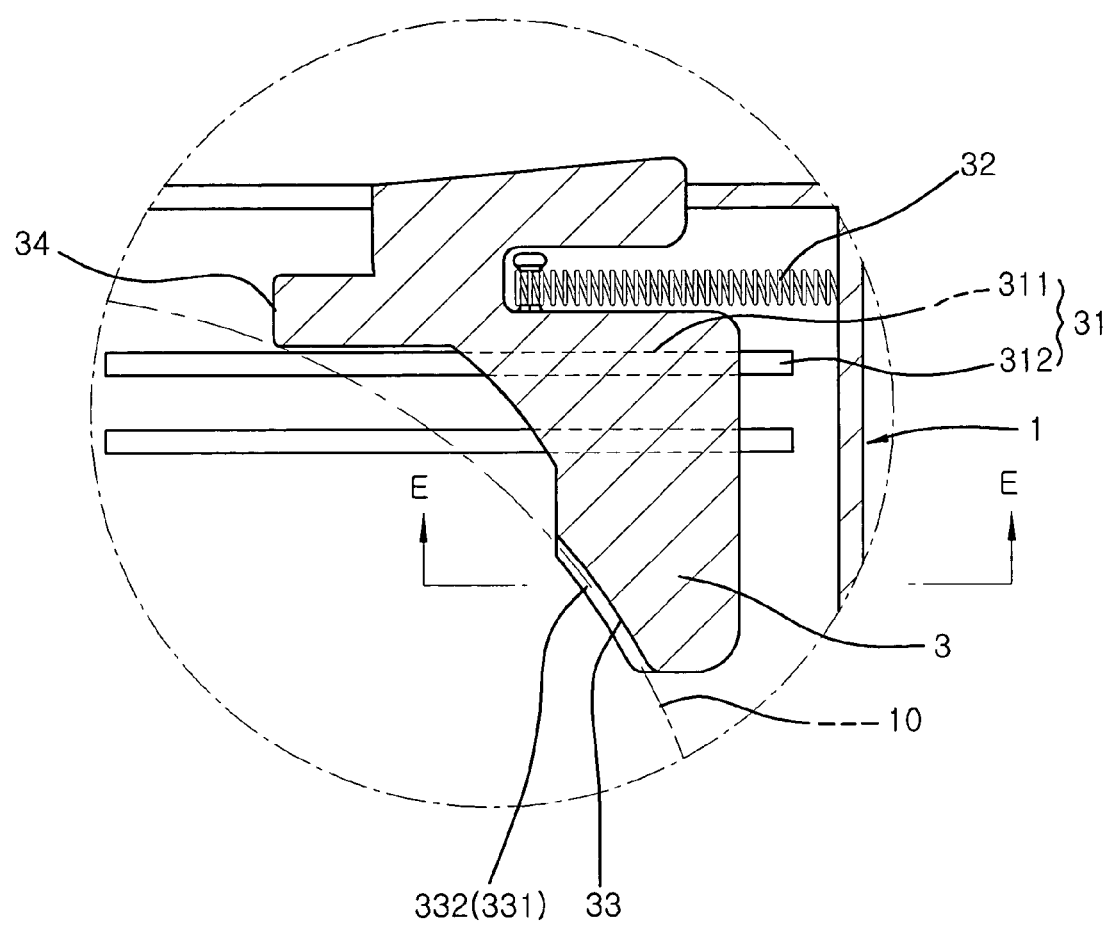
FIG. 7 is an enlarged view illustrating the circle portion D shown in FIG. 3.

FIG. 6 is an enlarged view of the circle portion C shown in FIG. 2. FIG. 7 is an enlarged view of the circle portion D shown in FIG. 3.

As shown in FIGS. 6 and 7, between the respective discharge operating cam plates 3 and the corresponding inner side wall surfaces of the case body 1 are provided restoration springs 32, respectively. These restoration springs 32 are used to return the discharge operating cam plates 3, which were laterally moved to the middle of the receiving space 12, to their original positions after the received disc 10 is discharged. Even when the disc case is empty, the restoration springs 32 serve to continuously space the discharge operating cam plates 3 from each other, thereby securing convenience in the insertion of the disc 10.

Meanwhile, each of the guide units 31 comprises: one or more laterally extending guide grooves 311 symmetrically recessed in upper and lower surfaces of an associated one of the discharge operating cam plates 3, and protruding guides 312 formed at inner top and bottom surfaces of the case body 1 so that they are slidably inserted in the guide grooves 311, respectively.

In addition, each of the discharge operating cam plates 3 comprises: a circular arched surface 33 which is formed at a partial front region of an inner peripheral surface thereof so as to come into close contact with either side of the rear periphery of the disc 10, thereby discharging the disc 10; and an inwardly protruded portion 34 which is formed at a partial rear region of the inner peripheral surface thereof so as to first push the rear periphery of the disc 10 before the circular arched surface 33 comes into contact with either side of the disc 10.

Figure 8:
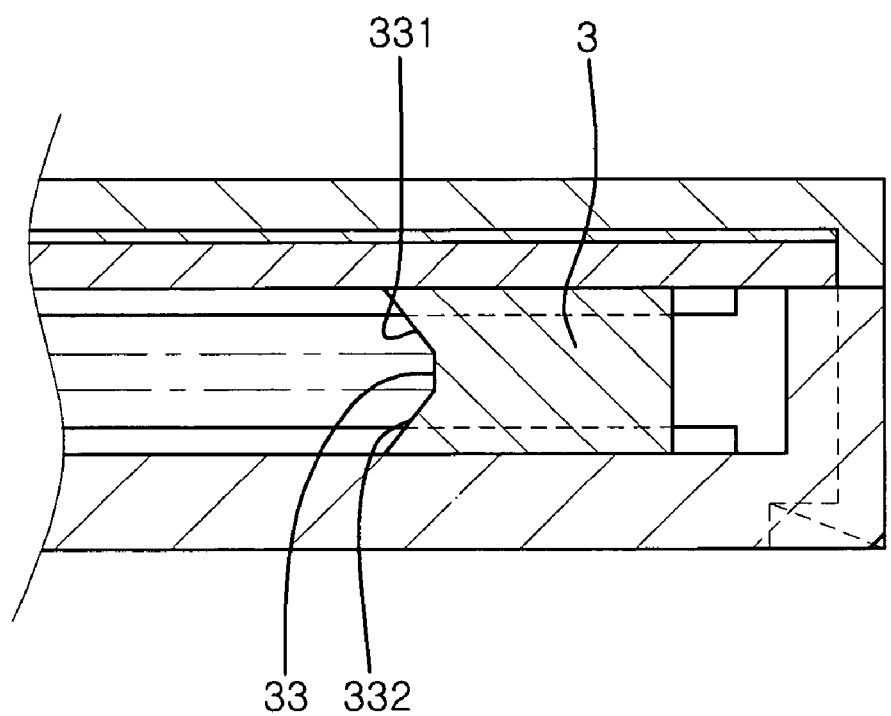
FIG. 8 is a sectional view taken along the line E—E shown in FIG. 7.

Reference is now made to FIG. 8, which is a sectional view taken along the line E—E shown in FIG. 7. The circular arched surface 33, as shown in FIGS. 7 and 8, has symmetrical upper and lower inclined surface portions 331 and 332, which define a groove having a deepest depth at a portion corresponding to the middle height of the receiving space 12 so that the received disc 10 is positioned at the middle height.

With such a configuration, in the discharge course of the received disc 10, the inwardly protruded portions 34 of the discharge operating cam plates 3 first come into contact with the rear periphery of the disc 10 so as to push the disc 10 forward to some extent, and then the circular arched surfaces 33 come into contact with opposite sides of the rear periphery of the disc 10 so as to forcibly push the disc 10 forward, thereby causing smooth discharge of the disc 10.

That is, as the inwardly protruded portions 34 first push the rear periphery of the disc 10 forward, the disc 10 is subjected to a forward movement force. Therefore, in such a forwardly moved state, the disc 10 can be smoothly discharged forward even if the opposite sides of the rear periphery of the disc 10 are laterally pushed.

Figure 9:
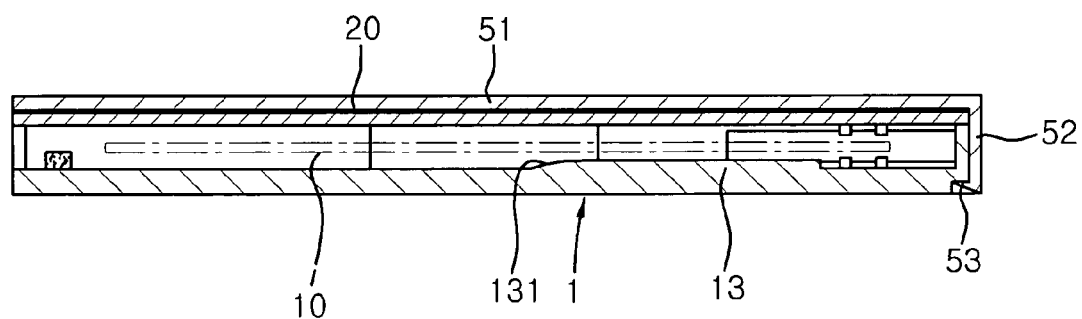
FIG. 9 is a side sectional view taken along the line F—F shown in FIG. 1.

Reference is now made to FIG. 9, which is a sectional view taken along the line F—F shown in FIG. 1. At the inner bottom surface of the case body 1 is provided a raised guidance region 13, which longitudinally extends rearward from the middle of the receiving space 12 by a predetermined length. The raised guidance region 13 causes the disc 10 to be inserted in the receiving space 12 along the middle height thereof. In order to facilitate such a guiding operation, the raised guidance region 13 has a rounded front portion 131.

Therefore, during the insertion of the disc 10, the disc 10 is placed on an upper surface of the raised guidance region 13, thereby being positioned at the middle height of the receiving space 12.

Now, the operation of the insertion type compact disc case configured as stated above will be explained.

Referring first to FIGS. 1 and 3 illustrating a state wherein the disc 10 is completely inserted in the receiving space 12 of the case body 1, both the discharge operating cam plates 3 are completely retracted to both lateral positions in the rear region of the receiving space 12, and the locking units 4, located at both sides of the receiving space 12, laterally push opposite sides of the front periphery of the received disc 10.

That is, as the front portions of the locking bars 42 bend inward under the operation of the plate springs 43 integrally formed with the locking bars 42, they constantly push the opposite sides of the front periphery of the disc 10 received in the receiving space 12.

Figure 10:
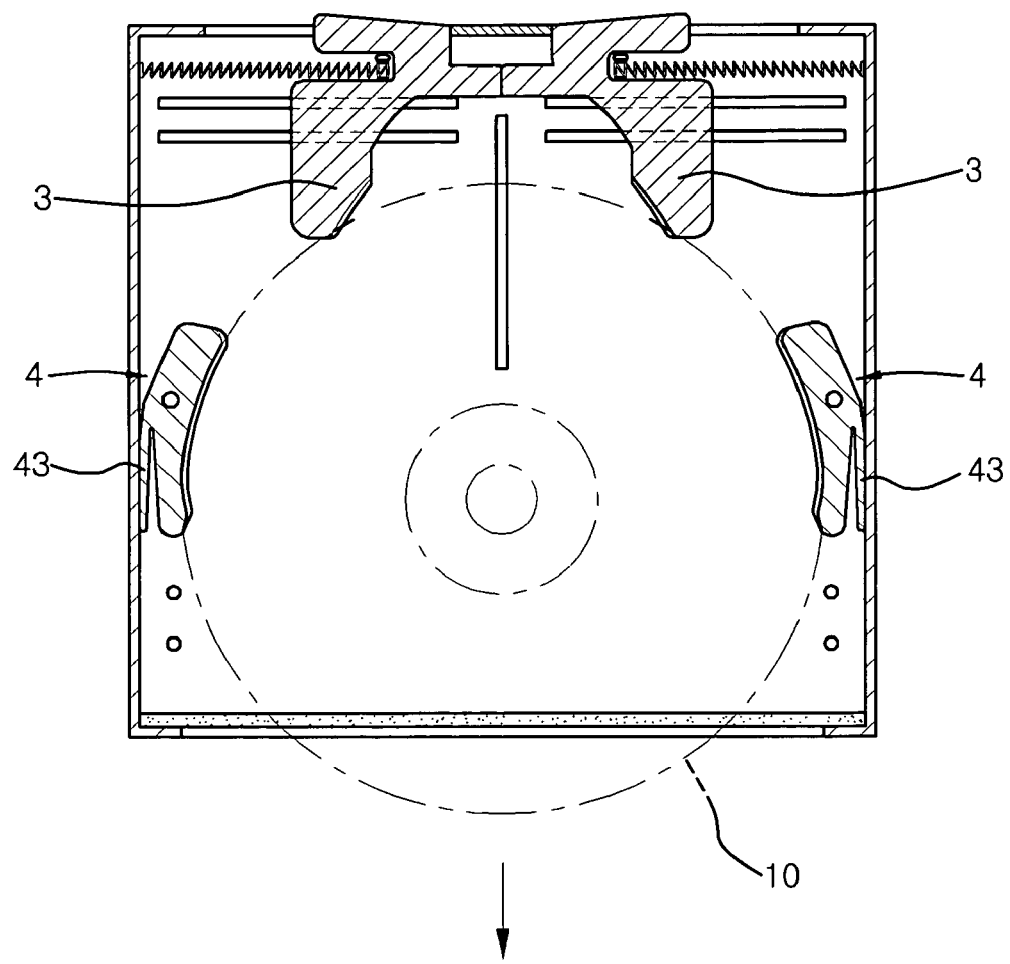
FIG. 10 is a plan sectional view illustrating a discharge state of a circular compact disc from the disc case in accordance with the present invention.

In succession, reference is made to FIG. 10, which illustrates a discharge state of the disc 10 from the disc case. For the discharge of the disc 20 completely inserted in the receiving space 12, first, both the discharge operating cam plates 3 are simultaneously moved to approach each other as the user operates the outwardly protruding rear portions of the discharge operating cam plates 3. According to such a simultaneous inward movement of both the discharge operating cam plates 3, they push opposite sides of the rear periphery of the received disc 10 forward by making use of their inner peripheral surfaces.

When the disc 10 is pushed forward by such an external force, since the disc 10 is subjected to a strong forward movement force, the front portions of both the locking units 4 located at both sides of the receiving space 12 rotate outward about their fixing poles 41, respectively. That is, the front portions of both the locking bars 42 bend outward when the disc 10 begins to be discharged forward, and then are returned inward by the restoration force of the plate springs 43.

On the contrary, when the disc 10 is inserted again through the front opening 11, the front portions of the locking bars 42 located at both sides of the receiving space 12 bend outward by an insertion pushing force of the disc 10. Then, after the disc 10 is completely inserted in the receiving space 12, the locking bars 42 are returned to their inward original positions by making use of the restoration force of the plate springs 43 formed along the outer edge of the locking bars 4, thereby firmly holding the opposite sides of the front periphery of the disc 10.

In this way, the disc 10 can be safely received in the disc case without an inadvertent discharge risk even when the disc case is carried.

Figure 11:
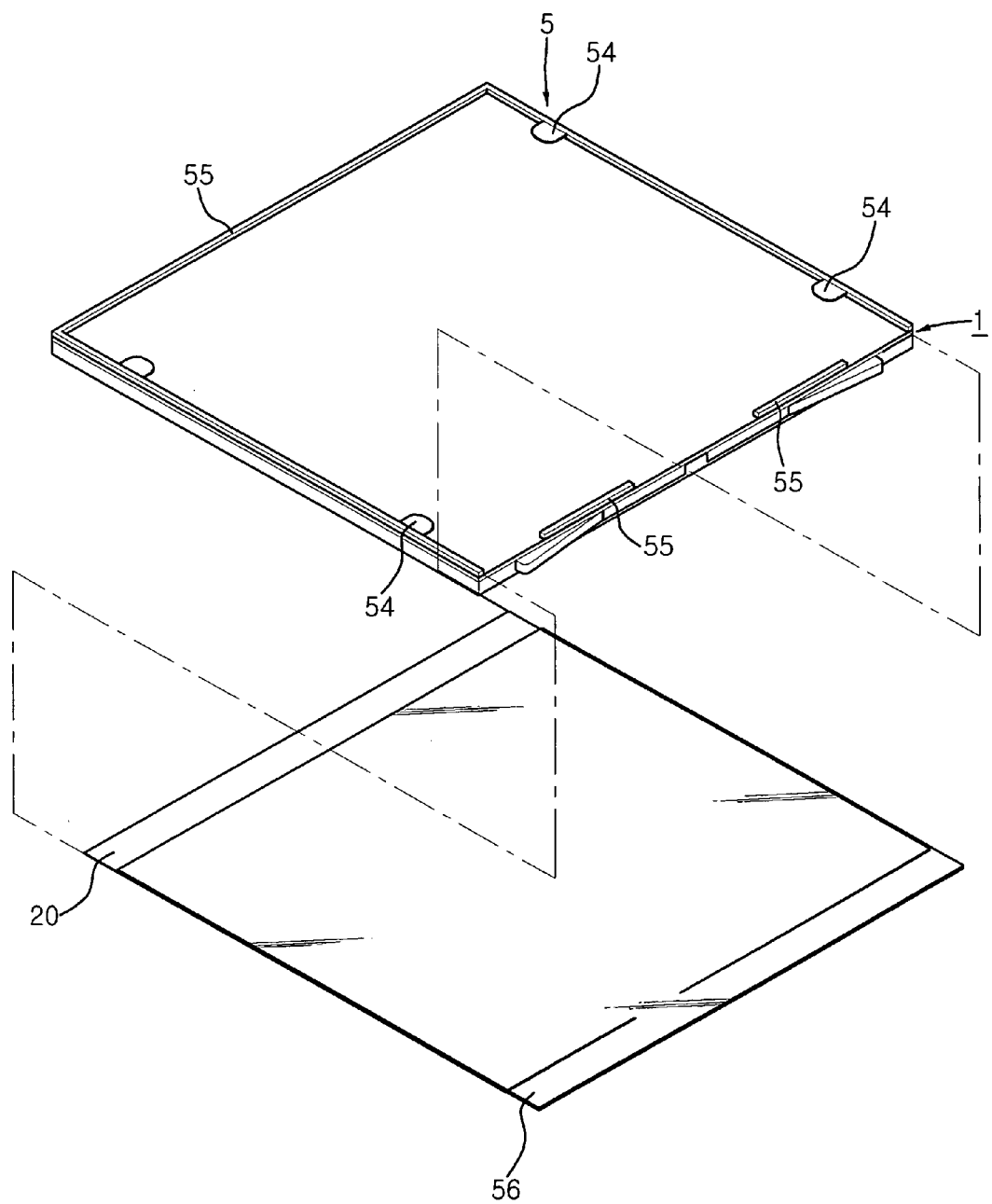
FIG. 11 is a rear exploded perspective view illustrating a case body in accordance with another embodiment of the present invention.

Reference is now made to FIG. 11, which illustrates a case body, designated as reference numeral 1, in accordance with another embodiment of the present invention.

Under an assumption wherein interior structure of a disc case in accordance with the present embodiment is the same as that of the previous embodiment, the present embodiment differs from the previous embodiment in relation to an inner sheet insertion unit 5 provided at an upper side of the case body 1. The inner sheet insertion unit 5 comprises: a plurality of fitting projections 54 inwardly protruding from both side edges of an upper surface of the case body 1 for fixing both side edges of the inner sheet 20; a transparent plate 56 placed on the fitting projections 54 for covering an upper surface of the inner sheet 20; and a plurality of fixing bars 55 attached to front and rear inner wall surfaces of the case body 1 for preventing slippage of the inner sheet 20 inserted in the fitting projections 54 as well as transparent plate 56.

With such a configuration, as the inner sheet 20 is fixed by the fitting projections 54 formed at both side edges of the case body 1, and the transparent plate 56 is disposed on the fitting projections 54 for protecting the inner sheet 20, the inner sheet 20 is received in the case body 1.

As apparent from the above description, the present invention provides an insertion type compact disc case, which is designed to simultaneously push forward opposite sides of a rear periphery of a disc, received in a case body thereof, thereby securing safe and accurate discharge of the disc. This has an effect of preventing damage to the disc in the insertion course thereof.

Further, the present invention can secure easy insertion of an inner sheet into the disc case.

The disc case of the present invention is further designed to firmly hold both sides of the disc received in the receiving space, thereby being capable of preventing inadvertent discharge of the disc from the disc case when the disc case is carried, resulting in an enhancement in storage stability.

Furthermore, by virtue of the fact that the disc is positioned at a middle height of the receiving space so as to prevent external shock from being directly transmitted thereto, it is possible to more safely and effectively protect the disc.

Finally, according to the present invention, when the disc is inserted into and discharged from the receiving space, impurities on a surface of the disc can be removed, thereby eliminating a necessity of separate cleaning of the disc surface.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An insertion type compact disc case comprising:
   a case body internally defining a square receiving space, into and from which a circular compact disc is inserted and discharged through an opening formed at a front surface thereof;
   a pair of elongated slits laterally formed at a rear surface of the case body; and
   a pair of discharge operating cam plates symmetrically arranged at both lateral positions in a rear region of the receiving space in correspondence to both the elongated slits so that they are laterally movable along guide units, rear portions of the discharge operating cam plates protruding outward beyond the elongated slits so as to be exposed to the outside of the case body, respectively, as the discharge operating cam plates are laterally moved so as to approach each other according to manual operation of the outwardly protruding rear portions thereof, inner peripheral surfaces of both the discharge operating cam plates pushing opposite sides of a rear periphery of the disc forward, thereby discharging the disc to the outside.

2. The case as set forth in claim 1, wherein restoration springs are provided, respectively, between an outer periphery of the respective discharge operating cam plates and an associated inner side wall surfaces of the case body for returning the discharge operating cam plates, which were laterally moved to a middle of the receiving space, to their original positions after the received disc is discharged.

3. The case as set forth in claim 2, further comprising:
   a pair of locking units symmetrically arranged at both sides of the receiving space for holding both sides of the disc received in the receiving space.

4. The case as set forth in claim 2, wherein each of the discharge operating cam plates includes:
   a circular arched surface formed at a partial front region of an inner peripheral surface thereof so as to come into close contact with either side of the rear periphery of the disc for the discharge of the disc; and
   an inwardly protruded portion formed at a partial rear region of the inner peripheral surface thereof so as to first push the rear periphery of the disc before the circular arched surface comes into close contact with either side of the disc.

5. The case as set forth in claim 4, further comprising:
   a pair of locking units symmetrically arranged at both sides of the receiving space for holding both sides of the disc received in the receiving space.

6. The case as set forth in claim 4, wherein the circular arched surface has symmetrical upper and lower inclined surface portions, which define a groove having a deepest depth at a portion corresponding to a middle height of the receiving space so that the received disc is positioned at the middle height.

7. The case as set forth in claim 6, further comprising:
   a pair of locking units symmetrically arranged at both sides of the receiving space for holding both sides of the disc received in the receiving space.

8. The case as set forth in claim 4, wherein each of the guide units includes:
   one or more laterally extending guide grooves symmetrically recessed in upper and lower surfaces of an associated one of the operating cam plates; and
   protruding guides formed at inner top and bottom surfaces of the case body so that they are slidably inserted in the guide grooves, respectively.

9. The case as set forth in claim 8, further comprising:
   a pair of locking units symmetrically arranged at both sides of the receiving space for holding both sides of the disc received in the receiving space.

10. The case as set forth in claim 1, further comprising:
    inner sheet insertion means provided at an upper surface of the case body for the insertion of an inner sheet.

11. The case as set forth in claim 10, further comprising:
    a pair of locking units symmetrically arranged at both sides of the receiving space for holding both sides of the disc received in the receiving space.

12. The case as set forth in claim 10, wherein the inner sheet insertion means includes:
    a transparent cover plate for covering the inner sheet disposed on the upper surface of the case body; and
    a plurality of downwardly protruding hook pieces formed at predetermined positions of a periphery of the transparent cover plate so as to be caught by a lower edge of the case body for fixing the transparent cover plate relative to the upper surface of the case body.

13. The case as set forth in claim 12, further comprising:
    a pair of locking units symmetrically arranged at both sides of the receiving space for holding both sides of the disc received in the receiving space.

14. The case as set forth in claim 12, wherein the case body has a plurality of fitting grooves formed along an outer wall surface and the lower edge thereof so that the downwardly protruding hook pieces are tightly fitted therein so as not to protrude out of the case body.

15. The case as set forth in claim 14, further comprising:
    a pair of locking units symmetrically arranged at both sides of the receiving space for holding both sides of the disc received in the receiving space.

16. The case as set forth in claim 10, wherein the inner sheet insertion means includes:
    a plurality of fitting projections inwardly protruding from both side edges of the upper surface of the case body for fixing both side edges of the inner sheet;
    a transparent plate placed on the fitting projections for covering an upper surface of the inner sheet; and a plurality of fixing bars attached to front and rear inner wall surfaces of the case body for preventing slippage of the inner sheet inserted in the fitting projections as well as the transparent plate.

17. The case as set forth in claim 16, further comprising:
a pair of locking units symmetrically arranged at both sides of the receiving space for holding both sides of the disc received in the receiving space.

18. The case as set forth in claim 1, further comprising:
a pair of locking units symmetrically arranged at both sides of the receiving space for holding both sides of the disc received in the receiving space.

19. The case as set forth in claim 18, wherein each of the locking units includes:
a fixing pole located at a middle of either side edge of the receiving space;
a locking bar longitudinally fitted at a center thereof to the fixing pole in a rotatable manner, a front portion of the locking bar defining a rotation space together with an adjacent inner side wall surface of the case body, an inner peripheral surface of the locking bar taking the form of a circular arched surface suitable for holding either side of the received disc; and
a plate spring extending forward from an outer edge of the locking bar so that it is positioned in the rotation space while coming into contact with the inner side wall surface of the case body, the plate spring serving to constantly push the front portion of the locking bar inward.

20. The case as set forth in claim 19, wherein the circular arched surface of the locking bar has symmetrical upper and lower inclined surface portions, which define a groove having a deepest depth at a portion corresponding to the middle height of the receiving space in order to allow the received disc to be positioned at the middle height of the receiving space.

21. The case as set forth in claim 18, wherein the case body further has a sponge strip attached to the inner bottom surface of the case body immediately inside the front opening for removing impurities on a recorded surface of the disc.

22. The case as set forth in claim 18, wherein a raised guidance region is formed at the inner bottom surface of the case body so that it longitudinally extends rearward from a middle of the receiving space for allowing the disc to be inserted along the middle height of the receiving space, the raised guidance region having a rounded front portion.

* * * * *